Patented Feb. 21, 1939

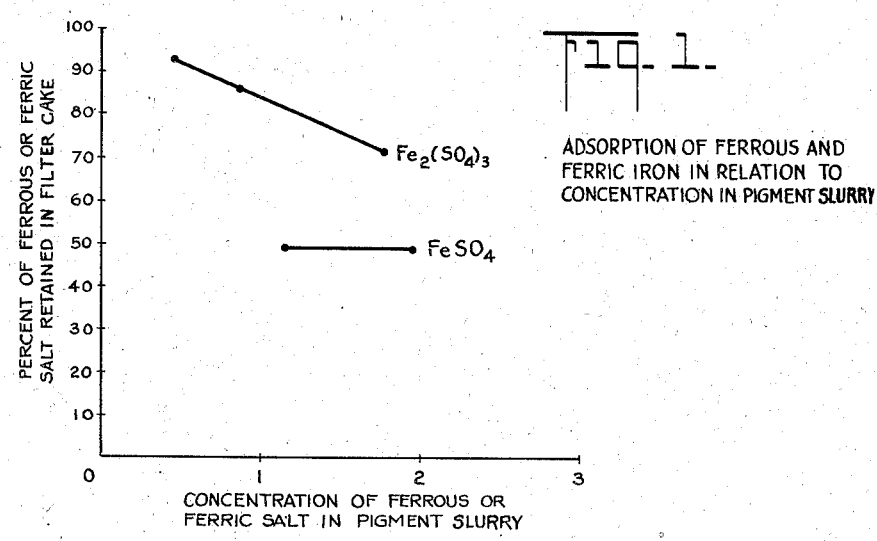
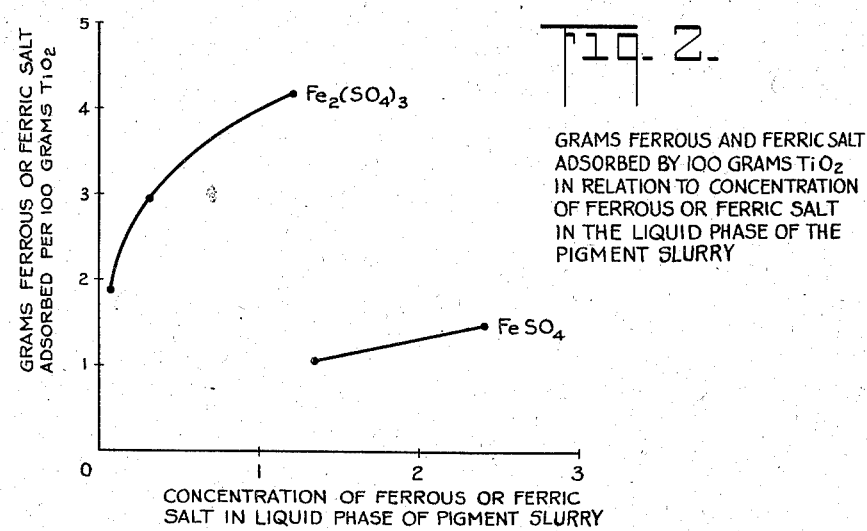

2,148,283

UNITED STATES PATENT OFFICE 2,148,283

PREPARATION OF WHITE TITANIUM DIOXIDE PIGMENTS

Willis F. Washburn, Metuchen, N. J., assignor, by mesne assignments, to National Lead Company, New York, N. Y., a corporation of New Jersey Application May 11, 1936, Serial No. 79,003

2 Claims. (Cl. 134—58)

This invention relates to titanium pigments. It has particular reference to a method of treating hydrous titanium dioxide or mixtures thereof with extenders such as barium sulfate and calcium sulfate whereby after calcination pigments of superior whiteness are obtained.

Industrial processes for the preparation of titanium pigments comprise the thermal hydrolysis of a titanium solution, usually a sulfate solution obtained from a sulfuric acid treatment of a titanium ore and subsequent dissolution of the resulting digestion cake. The titanium solutions found to be most useful are those obtained from ilmenite, an ore which contains considerable iron. Thus the resulting titanium solution will contain a considerable amount of dissolved iron salts. In order to prevent hydrolysis of ferric salts this iron is kept in a reduced state and may even be partially removed by crystallization, for example, as ferrous sulfate. Thus, industrial ilmenite solutions which are at present used in the manufacture of titanium pigments contain a certain proportion of iron in the ferrous condition.

As a result of thermal hydrolysis of industrial ilmenite solutions hydrous titanium oxide is precipitated. Although there is substantially no hydrolysis of iron compounds, the freshly precipitated hydrous titanium oxide always carries entrained in the so-called "pigment pulp" a small amount of iron in the ferrous condition. At the same time the hydrous titanium oxide or "pigment pulp" always contains a certain percentage of adsorbed or chemically combined mineral acid depending upon the type of solution employed for hydrolysis, usually sulfuric acid.

In order to remove as much iron as possible so that the calcined pigment will possess a satisfactory color the crude "pigment pulp" is subjected to a prolonged washing treatment. This washing treatment is effective only in removing those iron salts which are not adsorbed by the pigment pulp. Those iron salts which have been taken up or adsorbed by the pigment pulp cannot be removed by washing with water, possibly due to the fact that they are oxidized from ferrous iron to ferric iron during the washing process, as will be subsequently explained. Whether this be true or not, the fact is that it is impossible to reduce by mere washing the iron content of a titanium pigment pulp much below 0.1% and the adsorbed or combined mineral acid content, for example, sulfuric acid content, below 5% to 8%.

Although an iron content of about 0.1% did not render the finished pigment unsuited for industrial use, it was recognized that greater purity was desirable in order to obtain pigments of superior whiteness. It is well-known that when the so-called pigment pulp is subjected to a digestion in the presence of added mineral acid and a reducing agent, the major part of the iron may be removed. Such treatments involve suspending the precipitated hydrous titanium oxide pigment pulp in water containing added mineral acid, e. g. hydrochloric acid and a reducing agent, e. g. hydrogen sulfide, or a soluble thiosulfate or sulfide salt. The digestion is preferably conducted at an elevated temperature with agitation for from six to eight hours, sometimes as long as twenty-four hours. It will be readily seen that such treatments always included an additional step in the process of manufacturing titanium pigment. This step involves additional expensive apparatus, increases the processing time, and adds to the unit production costs while, at the same time, interrupting the continuous washing process.

In the prior art, the precipitated hydrous titanium dioxide is subjected to washing and filtering operations prior to subjecting it to the action of the reducing agent. In the interval between the precipitation and reducing agent treatment there apparently takes place no oxidation of ferrous salts to ferric salts.

By means of my present invention the same beneficial effects resulting from the prior art treatment may be obtained without the necessity of resorting to the expediency of an additional process step. Briefly, my invention comprises subjecting hydrous titanium oxide or other titanium oxide pigment pulp consisting of mixtures of hydrous titanium oxide with extenders throughout the regular washing and filtering treatment to the action of a reducing agent in the absence of added mineral acid.

Thus, it will be seen that the object of my invention is an improved method for obtaining titanium pigments of a whiteness equal to prior art pigments in a manner more efficient, more economical, and quicker than prior art methods.

I have discovered that ferric salts are adsorbed by hydrous titanium oxide to a much greater degree than ferrous salts and it is another object of my invention to prevent the oxidation of the initially adsorbed ferrous iron thus rendering unnecessary the use of an additional mineral acid to complete the purification of the pigment.

In order that the objects and advantages of my invention will be readily appreciated, the following experiments are of interest in showing the relative adsorption of ferrous iron and ferric iron by hydrous titanium oxide.

Various quantities of ferrous and ferric sulfate in the form of aqueous solutions were added to about 200 grams of titanium pigment pulp, containing about 33½% $TiO_2$. Additional water was added to bring the weight of the slurry to 300 grams. The slurry was agitated at room temperature for about one hour, filtered and the filtrate analyzed, the weight of ferrous or ferric sulfate retained in the cake being obtained by difference. In order to obtain approximate comparative data on the amounts of ferrous and ferric sulfate actually adsorbed by the pulp it was assumed that the solid phase of the filter cake had the composition $H_2TiO_3$ and that the adsorbed or chemically combined sulfuric acid, expressed as $SO_3$ was 5%. The proportion of liquid phase in the filter cake and the amount of ferrous or ferric salt dissolved in the liquid phase, assuming the concentration of the salt to be the same as in the filtrate, were then calculated. This amount was subtracted from the total salt in the filter cake to give the amount adsorbed, and this figure was then expressed in grams adsorbed per 100 grams $TiO_2$. The results follow:

Table No. 1

|  | $FeSO_4$ | | $Fe_2(SO_4)_3$ | | |
| --- | --- | --- | --- | --- | --- |
| Pigment pulp........grams.. | 196.01 | 205.8 | 197.4 | 201.8 | 205.1 |
| $TiO_2$ in pulp..........do.... | 63.1 | 65.9 | 65.6 | 67.6 | 67.7 |
| Weight slurry..........do.... | 295.2 | 303.3 | 298.0 | 296.7 | 298.5 |
| Filtrate................do.... | 131.4 | 128.9 | 128.7 | 118.9 | 122.6 |
| Filter cake.................. | 163.8 | 174.4 | 169.3 | 177.8 | 175.9 |
| $TiO_2$ in cake......per cent.. | 38.54 | 37.78 | 38.76 | 38.01 | 38.46 |
| Total added salt....grams.. | 3.436 | 5.988 | 1.381 | 2.628 | 5.32 |
| Salt in slurry......per cent.. | 1.16 | 1.97 | 0.46 | 0.88 | 1.78 |
| Salt in filtrate........grams.. | 1.743 | 3.040 | 0.088 | 0.3651 | 1.49 |
| Concentration of salt in filtrate.............per cent.. | 1.326 | 2.359 | 0.0684 | 0.307 | 1.21 |
| Salt in cake..........grams.. | 1.693 | 2.948 | 1.293 | 2.263 | 3.83 |
| Concentration of salt in cake per cent.. | 1.034 | 1.690 | 0.764 | 1.27 | 2.18 |
| Total salt retained in cake per cent.. | 49.3 | 49.3 | 93.0 | 86.1 | 72.1 |
| Grams salt adsorbed per 100 gr. $TiO_2$.................... | 1.07 | 1.50 | 1.88 | 2.96 | 4.18 |

The percentage of total ferrous or ferric salt retained in the filter cake is shown on Figure 1 attached hereto. Figure 2 shows the increase in amount of adsorbed iron for both ferrous and ferric iron related to increase in concentration of iron salt in the liquid phase of the pigment slurry. Both figures show graphically that ferric iron as sulfate is more readily adsorbed by hydrous titanium oxide than ferrous.

Thus, one of the improved results of my invention, namely, prevention of the formation of ferric iron can be readily understood. By keeping the iron in ferrous condition, it may be more readily removed during the filtering and washing operation.

In order to understand more fully my invention a somewhat detailed description of a typical washing treatment of a precipitated titanium pigment pulp is now given:

After the precipitation of hydrous titanium oxide is complete the hydrolysis solution which now consists of hydrous titanium oxide and acid mother liquor containing dissolved ferrous salts is filtered through a suitable filtering device. Such a device may be either a rotary vacuum filter or a so-called leaf filter which consists of a multiplicity of frames each carrying suitable filter cloth or paper. The filter cake, that is, the titanium pigment pulp is then mixed with the least amount of fresh water necessary to give a smooth flowing slurry. This procedure is known in the art as "repulping". The slurry is then filtered through a rotary or leaf filter, repulped with additional fresh water, refiltered and repulped for a number of times until the pigment pulp is deemed to be sufficiently washed. It is during this washing process that the iron salts present in pigment pulp are subject to oxidation and adsorption as ferric iron. According to prior art method this filtration and refiltration has to be interrupted to permit the pigment pulp to be subjected to a digestion in water containing a reducing agent and mineral acid in order to remove this adsorbed iron.

According to my invention the reducing agent is brought into contact with the hydrous titanium oxide during the first repulping operation which takes place after the removal of the spent acid hydrolysis liquor. Throughout the entire filtering and washing operation, that is, throughout the several operations of filtering, repulping and refiltering, reducing agent should be kept in contact with the hydrous titanium oxide. This may be accomplished, for example, by a single addition of a water-insoluble reducing agent, for example, metallic zinc in finely pulverulent form, during the first repulping. When using metallic zinc, sufficient sulfuric acid will be retained by the pulp to liberate nascent hydrogen through the entire filtering and washing operation. On the other hand additions of water-soluble reducing agents, for example, sulfur dioxide gas and water may be made at each repulping operation. When so conducted, no variation of the regular practice is necessary. The necessity for using added mineral acid is obviated and the filtering and washing operation need not be interrupted by another special reducing treatment.

A wide variety of reducing agents are suitable for the practice of my invention. Among those which I have found especially useful are metallic zinc, titanous compounds, sulfur dioxide gas, hydrogen sulfide, soluble sulfides, e. g. sodium sulphide, soluble thiosulfates, e. g. sodium thiosulfate, etc.

The quantity of reducing agent may be varied depending upon the amount of ferrous iron in contact with the precipitated hydrous titanium oxide and the conditions of the filtering and washing operation. It is not possible to state more specifically a range of concentrations for all reducing agents useful in the practice of my invention. As can be readily determined by those skilled in this art, the quantity of reducing agent employed should be sufficient to maintain reducing conditions throughout the washing process.

By the term "pigment pump" used in this description and the claims appended hereto, I mean to include not only precipitated hydrous titanium dioxide but composite pigment mixtures in which hydrous titanium dioxide is intimately associated with extenders such as calcium sulfate and barium sulfate.

I wish also to point out that my invention not only facilitates removal of iron but also other reducible impurities such as traces of other metals originally present in the ore which carry through the process with the titanium, for example, chromium and vanadium.

Titanium pigment pulps obtained from the practice of my invention when subjected to a calcination in the usual manner yield titanium pigments possessing whiteness, brightness and other pigment properties superior to pigment not treated with a reducing agent and at least equal to those treated according to prior art reducing methods.

The foregoing description of my invention has been given for clearness of understanding and no undue limitations should be deduced therefrom, but the appended claims should be interpreted as broadly as possible in view of the prior art.

I claim:

1. In the manufacture of a white titanium dioxide pigment by means of a process which includes subjecting a titanium pigment pulp containing adsorbed or combined mineral acid as well as oxidizable metallic impurities to a washing and filtration treatment consisting of a plurality of filtration, repulping and refiltering operations, the step which consists in bringing the said titanium pigment pulp in contact with a water-insoluble reducing agent during the first repulping operation in an amount sufficient to maintain, by reaction with the acid contained in the said pigment pulp, reducing conditions throughout the regular washing and filtration treatment in the absence of added mineral acid.

2. In the manufacture of a white titanium dioxide pigment by means of a process which includes subjecting a titanium pigment pulp containing adsorbed or combined mineral acid as well as oxidizable metallic impurities to a washing and filtration treatment consisting of a plurality of filtration, repulping and refiltering operations, the step which consists in bringing the said titanium pigment pulp in contact with finely divided metallic zinc during the first repulping operation in an amount sufficient to maintain, by reaction with the acid contained in the said pigment pulp, reducing conditions throughout the regular washing and filtration treatment in the absence of added mineral acid.

WILLIS F. WASHBURN.